Patented July 14, 1936

2,047,307

UNITED STATES PATENT OFFICE 2,047,307

MANUFACTURE OF A FOLLICLE HORMONE-QUINOLINE ADDITION PRODUCT

Adolf Butenandt, Gottingen, Germany, assignor to Schering-Kahlbaum A. G., Berlin, Germany No Drawing. Original application September 21, 1933, Serial No. 690,422. Divided and this application May 16, 1935, Serial No. 21,814. In Germany September 27, 1932

3 Claims. (Cl. 260—41)

My invention relates to the class of substances known as germinal gland hormones, which includes the follicle hormones, and has for one of its objects to provide means for producing combinations of said follicle hormones with other chemical compounds, these combinations being readily split up into their constituents, thereby enabling the hormone constituent to be obtained in pure state.

I have found that the follicle hormones can easily be made to combine with quinoline, compounds insoluble in water being obtained which form fine crystals. These compounds can be made use of with particular advantage for the purification of the follicle hormones, since on being acted upon with a dilute acid such as hydrochloric acid or sulphuric acid they will be split up again under the formation of the unchanged hormones. I have found this method to be particularly suitable in the separation of the follicle hormones from partly purified, however not altogether pure hormone preparations.

In practicing my invention I may for instance proceed as follows:—

Example 1 part of the crude follicle hormone $C_{18}H_{22}O_2$ is mixed with an equal quantity, by weight, of quinoline and the mixture cautiously heated so as to obtain complete solution. When this solution cools down, it solidifies as a whole, forming a crystal broth which is freed from liquid by pressing it onto a piece of unglazed pottery. The molecular addition compound thus obtained corresponds to the formula $C_{18}H_{22}O_2$—$C_9H_7N$, its melting point is 210° C. It can be recrystallized from its solution in ether and from pure alcohol. By acting with dilute acids on the addition compound itself or on solutions of it in organic solvents, for instance alcohol, the addition compound is readily decomposed into its components.

The present application is a division of my copending application, Ser. No. 690,422, filed September 21, 1933, now Patent No. 2,012,300.

Various changes may be made in the details disclosed in the foregoing specification without departing from the invention or sacrificing the advantages thereof.

I claim:—

1. The molecular addition compounds of the follicle hormones with quinoline, being well crystallized substances insoluble in water.

2. The molecular addition compound of the follicle hormone $C_{18}H_{22}O_2$ with quinoline, having the formula $C_{18}H_{22}O_2$—$C_9H_7N$, melting at 210° C. and being recrystallizable from its solutions in ether and in pure alcohol and readily decomposed into its components in dilute alcohol.

3. The method of producing the addition compound of claim 1, comprising cautiously heating equal parts by weight of the two reagents to obtain complete solution, allowing the solution to cool down and freeing the crystal broth, which is thereby formed, from the liquid adhering to it.

ADOLF BUTENANDT.